US008505663B2

(12) United States Patent
Saylor, Jr.

(10) Patent No.: US 8,505,663 B2
(45) Date of Patent: Aug. 13, 2013

(54) TRACTION ROBOT (76) Inventor: Edward T. Saylor, Jr., Vero Beach, FL (US)

( * ) Notice: Subject to any disclaimer, the term of this patent is extended or adjusted under 35 U.S.C. 154(b) by 0 days.

(21) Appl. No.: 13/540,238

(22) Filed: Jul. 2, 2012

(65) Prior Publication Data

US 2012/0285760 A1 Nov. 15, 2012

Related U.S. Application Data (63) Continuation of application No. 12/846,505, filed on Jul. 29, 2010, now Pat. No. 8,210,303.

(60) Provisional application No. 61/229,704, filed on Jul. 29, 2009.

(51) Int. Cl.
*B60B 39/00* (2006.01)

(52) U.S. Cl.
USPC .......................................................... 180/164

(58) Field of Classification Search
USPC .......................................................... 180/164
See application file for complete search history.

(56) References Cited

U.S. PATENT DOCUMENTS

| 3,991,842 | A  | * | 11/1976 | Larsen ............................. | 156/536 |
| 4,664,212 | A  |   | 5/1987  | Nagatsuka et al. | |
| 5,194,032 | A  | * | 3/1993  | Garfinkel ........................ | 446/178 |
| 5,366,038 | A  |   | 11/1994 | Hidetsugu et al. | |
| 5,487,440 | A  |   | 1/1996  | Seeman | |
| 6,090,221 | A  |   | 7/2000  | Gan et al. | |
| 6,099,091 | A  |   | 8/2000  | Campbell | |
| 6,102,145 | A  | * | 8/2000  | Fisher ............................. | 180/164 |
| 6,964,312 | B2 | * | 11/2005 | Maggio ........................... | 180/164 |
| 7,775,312 | B2 | * | 8/2010  | Maggio ........................... | 180/164 |
| 8,215,435 | B2 | * | 7/2012  | Dvorak ........................... | 180/164 |
| 2005/0072612 | A1 | * | 4/2005 | Maggio ........................... | 180/164 |
| 2006/0278454 | A1 | * | 12/2006 | Maggio ........................... | 180/164 |

* cited by examiner

*Primary Examiner* — Kevin Hurley
(74) *Attorney, Agent, or Firm* — Mattingly & Malur, PC (57) ABSTRACT

A traction unit has carrier sections on which suction cups or suction pads are mounted that are connected to a vacuum source. The carrier units are driven around the frame by a chain or belt driven by a motor. The frame has sections which move relative to one another horizontally and/or vertically in order to permit turning control of the traction unit and allowing for traversing of curved surfaces.

10 Claims, 11 Drawing Sheets

TRACTION ROBOT

CROSS REFERENCES TO RELATED APPLICATIONS

This application is a continuation-in-part of U.S. application Ser. No. 12/846,505, filed Jul. 29, 2009, which has been allowed, the entire disclosure of which is incorporated herein by reference, and claims the benefit of U.S. Provisional Application No. 61/229,704, filed Jul. 29, 2009 to the same inventor as herein, the entire disclosure of which is incorporated herein by reference.

BACKGROUND OF THE INVENTION

1. Field of the Invention

The present invention relates to a remote control device or self controlled robotic device used for traversing an apparatus for working on a surface while adhering to the surface through suctions cups or pads.

2. Description of Related Art

Remote controlled devices and robots are used in remote, hazardous or difficult to reach areas in which operations are performed. The traction device for such robots and remote control devices enables climbing a vertical wall or traversing a ceiling. Such devices are useful in non-destructive testing and of interest in the aircraft industry, in particular.

U.S. Pat. No. 7,404,464 to Imus et al discloses a traction device having a continuous traction belt provided on a pair of opposing rollers in which the traction belt includes openings such that a vacuum may be applied through the traction belt enabling the apparatus to cling to a working surface.

U.S. Pat. No. 6,742,617 discloses a traction unit that is able to traverse compound curves and surfaces having suction cups that enable the apparatus to adhere and release from the surface as the traction unit moves across a surface.

SUMMARY OF THE INVENTION

According to embodiments of the invention, a traction device has suction pads instead of or in addition to suction cups that enable the device to adhere to a smooth surface and/or an irregular surface on which it traverses, supported by carriers that traverse a frame. Suction is applied to the cups or pads to enable the cups or pads to engage the smooth or irregular surface to provide the resulting adhesion.

According to embodiments of the invention, the frame on which suction cups or pads are supported and move around is articulated and can be adjusted to change direction of the traction device as the traction device moves across the surface to which the suction cups or pads adhere.

According to embodiments of the invention, a traction unit is capable of traversing a surface at a controlled rate and turning by remote control on surfaces that include compound curves, vertical walls and ceilings. By mounting a working apparatus that performs sanding, buffing, paint removal, drilling or non-destructive testing equipment, the work surface can be traversed by the traction unit and work accomplished by remote control or robotically.

According to embodiments of the invention, the frame for holding the suction cups or pads is comprised of sections flexibly connected to one another to enable the sections of the traction unit to move with respect to one another for traversing a work surface in a straight line or at angles thereto in order to make turns in accordance with adjustments made between adjacent sections in the connection angle between therebetween for ensuring versatile movement of the traction unit in different directions along its path of travel.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

DETAILED DESCRIPTION OF THE INVENTION

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

Figure 1:
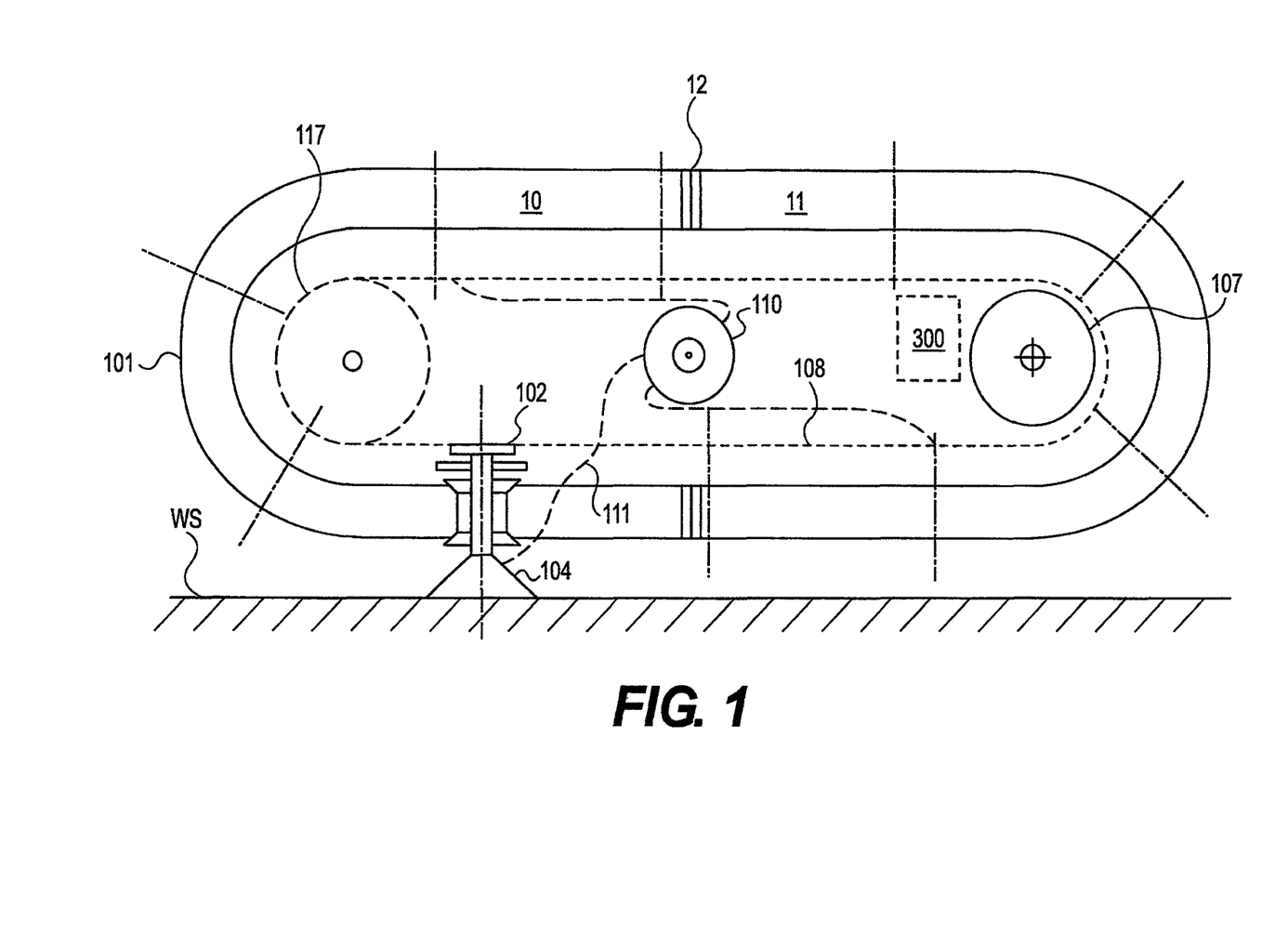
FIG. 1 is a side view of a traction unit according to a first embodiment of the invention shown schematically.
Figures 2, 3:
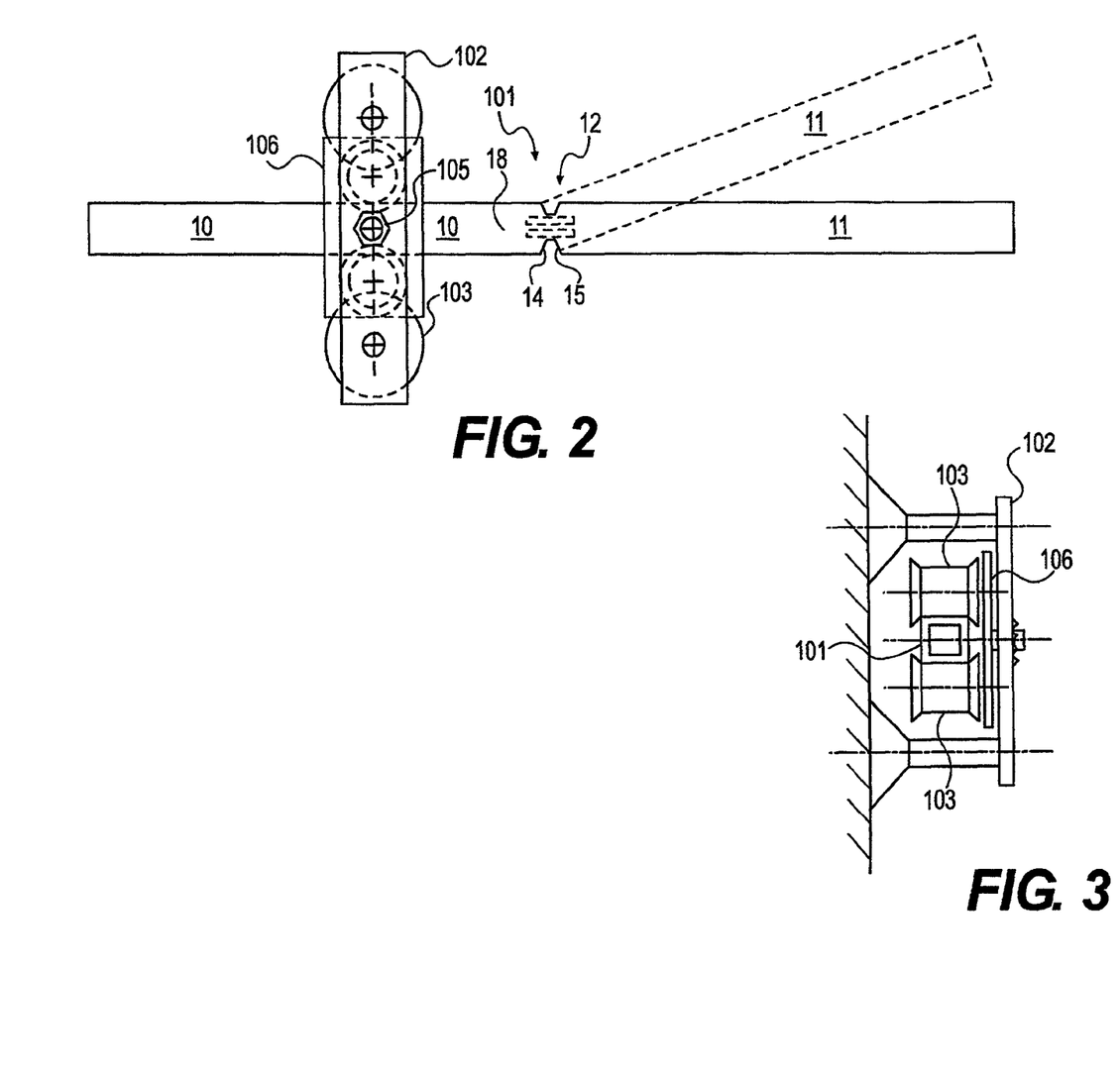
FIG. 2 is a top view of one part of a traction unit as shown in FIG. 1.
FIG. 3 is a side view of the carrier shown in FIG. 2 according to the embodiment of the invention shown in FIG. 1.

A traction unit according to one embodiment of the invention is shown schematically in side view in FIG. 1. The traction unit has a frame 101 of a shape, such as an oval shape, as shown in the figure. The frame is preferably of tubular construction having a rectangular cross-sectional shape as shown in FIG. 3, for example. A plurality of carriers 102, only one of which is shown for brevity, are mounted to move around the frame 101 and are spaced equidistantly around the frame as indicated schematically. The carriers 102 are, as shown in FIG. 3, provided with rollers 103 that engage frame 101 to move along frame 101. A chain 108 (shown schematically) is driven by a motor 107 at one end of the traction unit and supported by a sprocket 117 at the other end of the traction unit. The carrier 102 has a mounting connection to the chain 108 of a conventional type which enables the carrier 102 to be driven around the frame 101.

As shown in FIG. 1 the traction unit has a control unit 300 onboard, for example on the work platform or mounted internally, optionally with a microprocessor and with communication capability to a remote control to enable control of the traction unit by manipulating the speed of motor 107 and positioning of hydraulic actuators 18 to which the control unit is connected. Alternatively, control unit 300 has a program for commanding control of motor 107 and actuators 18 to traverse a programmed path. Feedback with respect to image or position and orientation (through accelerometers, a GPS system or localized position control system, for example) can also be used for input parameters to the control unit to ensure movement along the desired path.

Each carrier 102 has guide suction cups 104 that engage a work surface WS and are connected to a vacuum source 110 through a vacuum hose 111 (shown schematically) with the understanding that each of the carriers has a shared or separate suction hose connected to the suction cups. Further, the vacuum source is a vacuum pump self-contained within the traction unit or is a vacuum distributor which receives vacuum from a hose connected to a source of vacuum remotely from the traction unit. Further, the vacuum source is a vacuum pump self contained in the traction unit powered by compressed air. Further, compressed air can come into each of the carriers equipped with a venturi vacuum generator.

The frame 101 is comprised of sections 10 and 11 that are hinged or otherwise flexibly connected to each other at connection points 12 as shown in FIGS. 1 and 2 with respect to one such connection. The hinge joint embodiment enables movement in the horizontal plane and can be controlled by a set of operable hydraulic piston/cylinders. Alternatively, a ball joint connection between the frame sections 10 and 11 would enable horizontal and vertical movement with respect to the frame sections 10 and 11, using a set of piston/cylinder for each plane of movement (or one set for the combined movement) in which the piston/cylinder connections to the frames are themselves flexibly connected to allow for movement in both planes through the flexible connections.

Frame sections 10 and 11 have angled or tapered ends 14 and 15, respectively, to enable relative positioning between the frame section members without interference. The positioning of the frame members with respect to one another can be accomplished through suitable drive mechanisms, such as hydraulically actuated cylinders, driven pneumatically, 18, which are shown in the figure to be a pair of cylinders. When one cylinder contracts and the other cylinder expands, the frame section member 11 is able to move with respect to the position shown in dashed lines in FIG. 2 to be positioned at an angle with respect to frame section member 10. In this manner, the suction cup carrier 102 which moves along the frame 101 is positioned to turn the traction unit in one direction or another.

Figure 4:
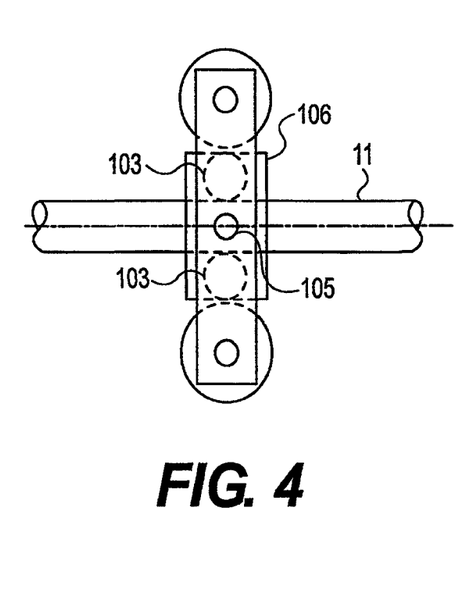
FIG. 4 is a schematic view of the positioning of the carrier with respect to the suction cups supported on a frame member with a traction unit of FIG. 1 traveling in a straight line direction.
Figure 5:
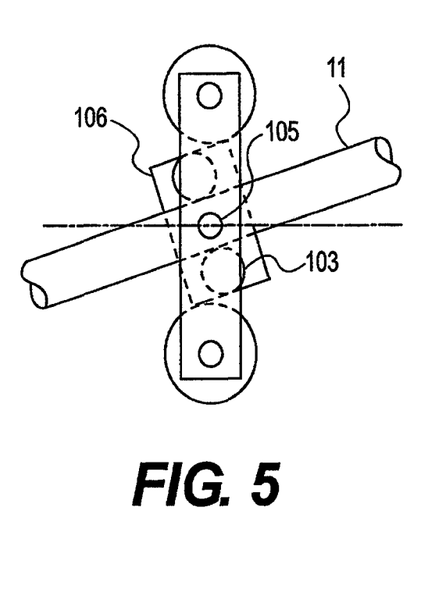
FIG. 5 is a view similar to FIG. 4 showing the section of one frame section pivoted to one side to show turning movement of the traction unit.
Figure 6:
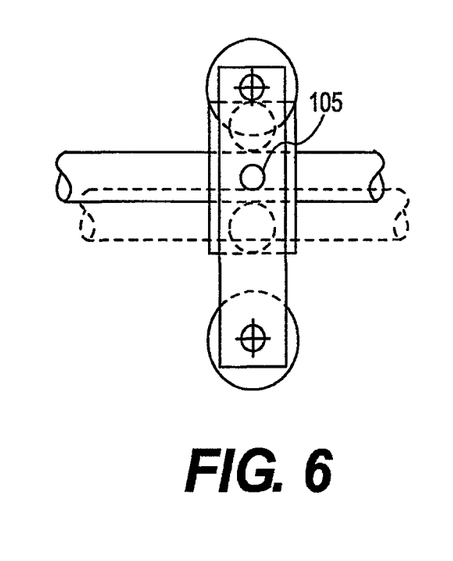
FIG. 6 is a view showing the displacement or direction change that is achieved by the adjustment in angle made between adjacent sections as shown in FIG. 5. when the support bracket moves with respect to the suction cups or pads and the traction unit turns.

FIGS. 4-6 show the adjustment made in the direction of movement of the traction unit schematically when positioning of a frame section 11 with respect to a frame section 10. In FIG. 4, frame section 11 is shown in a position shown by solid lines in FIG. 2. In FIG. 5, the frame section 11 is moved to the position shown by dashed lines in FIG. 2. As a result, the carrier 102, through the engagement of rollers 103 on the frame section member 11 of frame 101, changes its orientation such that forward movement along the frame section 11 results in displacement of the traction unit to a position shown in FIG. 6.

The movement of frame 11 not only turns but can move sideways from dotted line to solid line as shown in FIG. 6. This is accomplished by slotting the support bracket 102 to allow pin 105 to move and carry frame 11 to one side. This movement can be controlled by spring loading or cylinder (pneumatic or hydraulic). Another solution is a member can be connected by pin 105 then adjoined to ride in a slotted support bracket 102.

As shown in FIG. 3, a support bracket 106 supports the rollers 103 and is pivoted by a connection 105 which may be a pivot pin, threaded connector, rivet and the like, to carrier 102. The pivoted connection enables the support bracket 106 to pivot as shown in FIGS. 4-6, for example.

FIG. 7(a)-7(e) show the range of motion which the traction unit is able to move by making adjustments between the frame section members. Further, although only one connection between sections of frame 101 is shown in FIGS. 1 and 2, it is understood that frame 101 may comprise several sections including three or more sections, three of which are shown in FIGS. 7(a)-7(e).

Figure 7A:
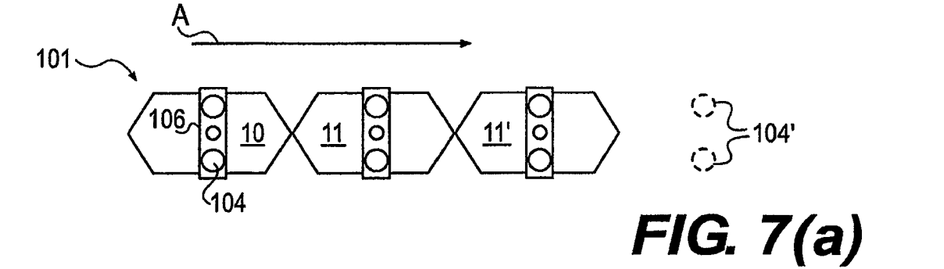
FIGS. 7(a)-7(e) show the position of the support bracket with respect to the suction cups or pads during straight line movement and during positioning according to an embodiment of the invention.
Figure 7B:
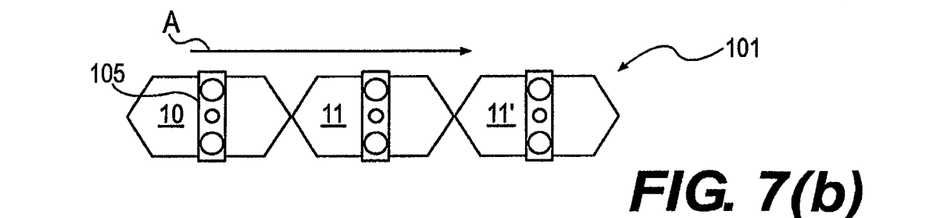

As shown in FIG. 7(a), the linked together sections 10, 11, 11' are able to shift with respect to one another with the resulting repositioning of the suction cups 104 carried by the carrier 102 as a result of the pivot pin 105 permitting relative movement between the support bracket 106 and the carrier 102.

Figure 7C:
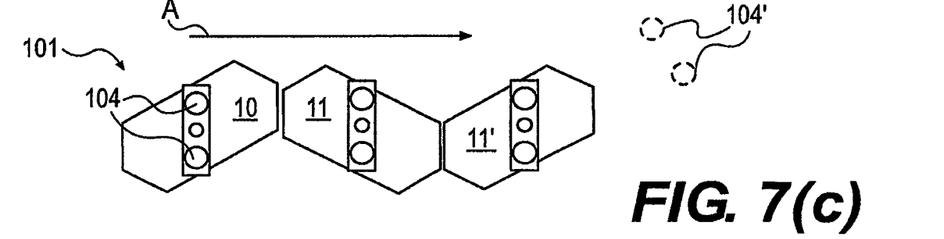
Figure 7D:
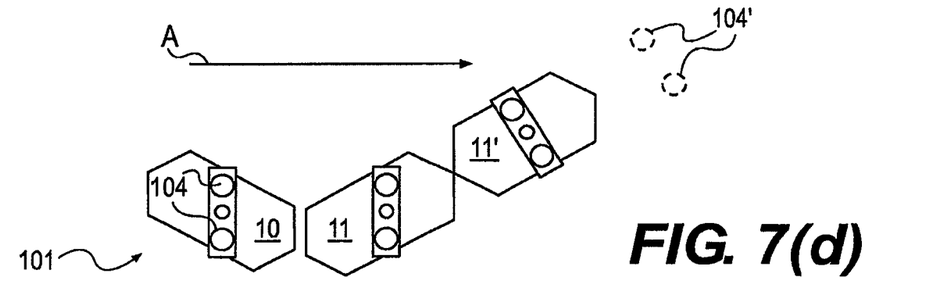
Figure 7E:
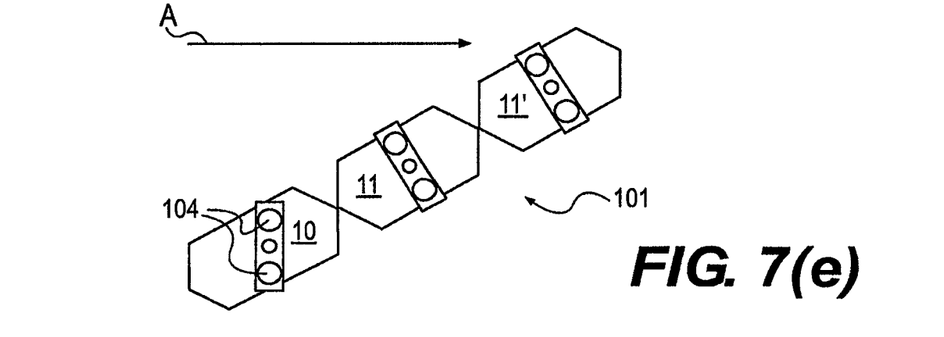

As shown, the positioning of the suction cups 104' is the same as FIG. 7(a) with respect to the initial position of suction cups 104 and is different in FIGS. 7(c) and 7(d) from the initial position of the suction cups. Accordingly, the articulation between the sections of the frame 101 enables movement of the traction unit as the traction unit traverses the work surface to a varying degree depending on the positioning of adjacent frame sections. FIG. 7(e) shows a result of an adjustment made between adjacent sections such that the traction unit proceeds at an angle shifted with respect to the direction of movement shown in FIG. 7(a) (arrow A in FIG. 7(a).

Figure 8:
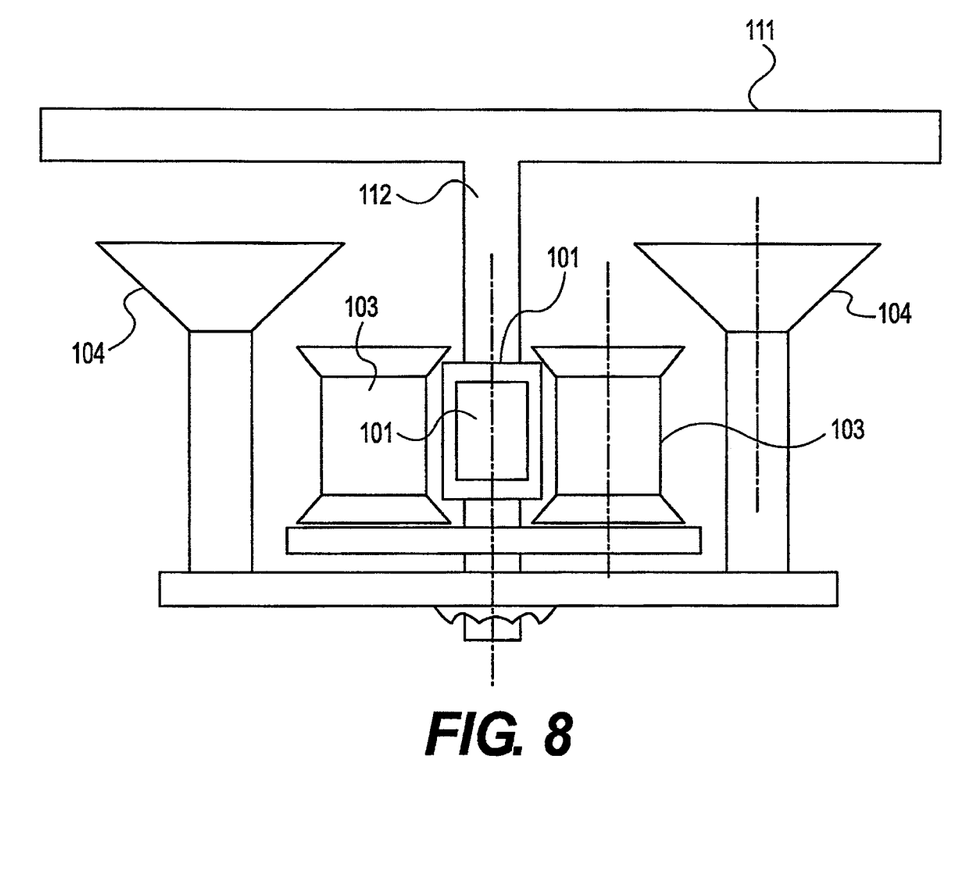
FIG. 8 shows a modification to the embodiment of the invention in which a platform supporting a work implement is attached to the frame for on a traction unit according to one embodiment of the invention.

FIG. 8 shows a detail of a support platform or base 111 for a working implement which is moved by the traction unit that is connected by a strut 112 to frame member 101. Support or base platform 111 enables the traction unit to move a device useful in working on surface WS to perform remotely controlled or self-controlled robotic operations such as grinding, sanding, paint removal, drilling, or non-destructive testing or painting on the surface of work, such as the skin of an aircraft. Further, for aircraft having a wing or a fuselage that extends in all directions vertical and horizontal and curved, the traction unit moves along these curved surfaces and provides a stable platform 111 on which work apparatus can be mounted for working on the work surface as the traction unit traverses the work surface. The platform is also suitable for the mounting of the control equipment that communicates remotely with the operator or that houses the microprocessor controller that operates and controls adjustments of the movements of the motor 107 and cylinders 18.

Figure 9:
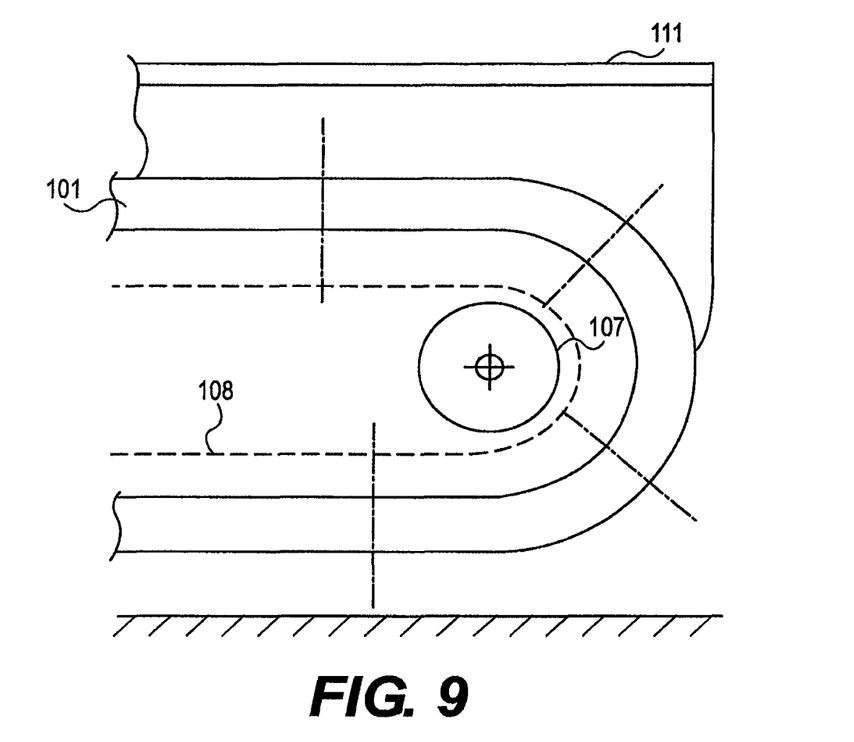
FIG. 9 shows another view of the base for a work implement as shown in FIG. 8.
Figure 10:
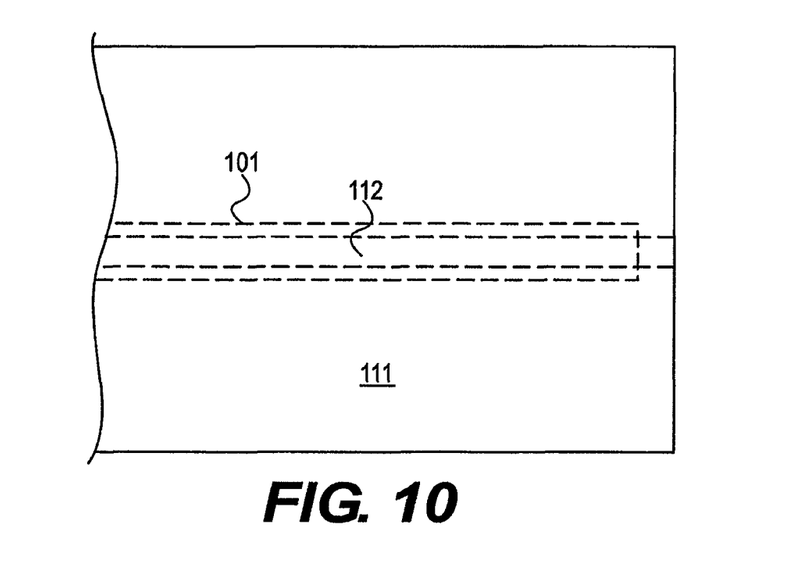
FIG. 10 shows a top view of the base for a work implement as shown in FIG. 8.

FIG. 9 shows the work platform or base 111 in side view mounted on a traction unit according to the embodiment of the invention shown in FIG. 1. FIG. 10 shows a top view of a portion of the work platform or base 111 shown in FIGS. 8 and 9.

Figure 11:
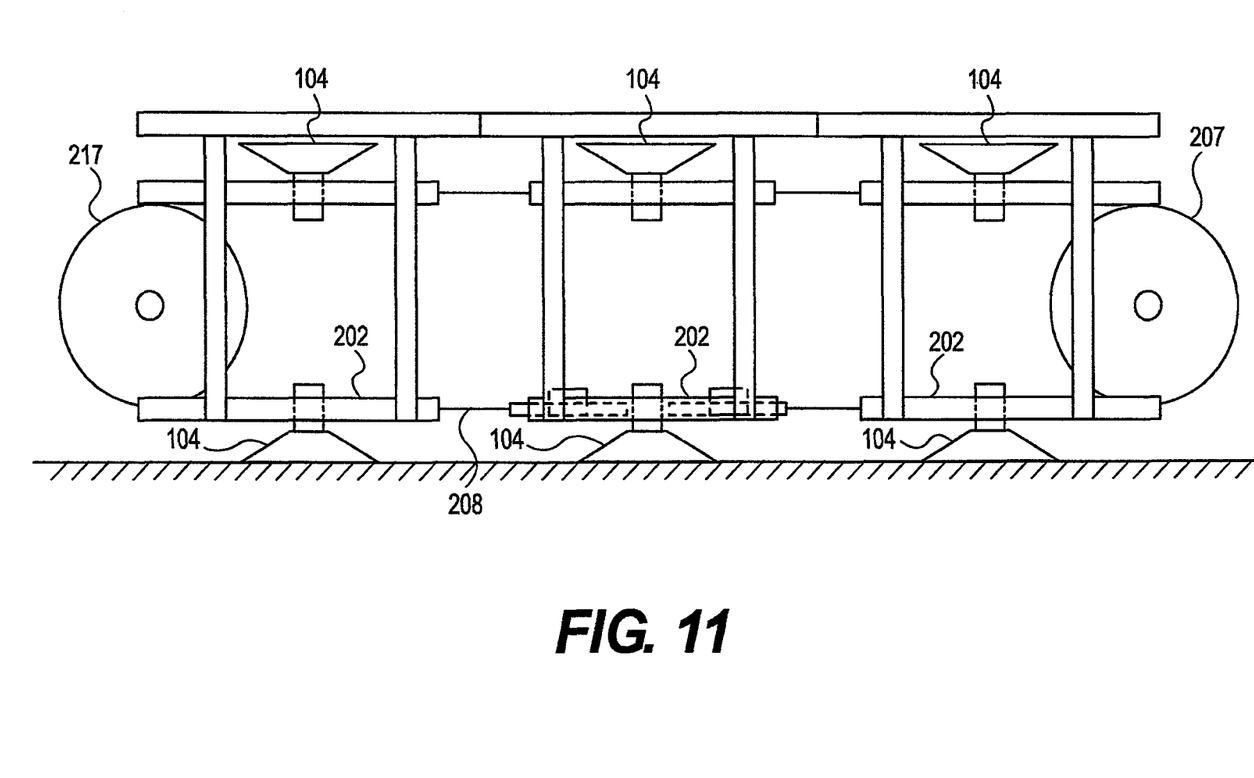
FIG. 11 shows a side view of another embodiment of the traction unit according to the invention.
Figure 12:
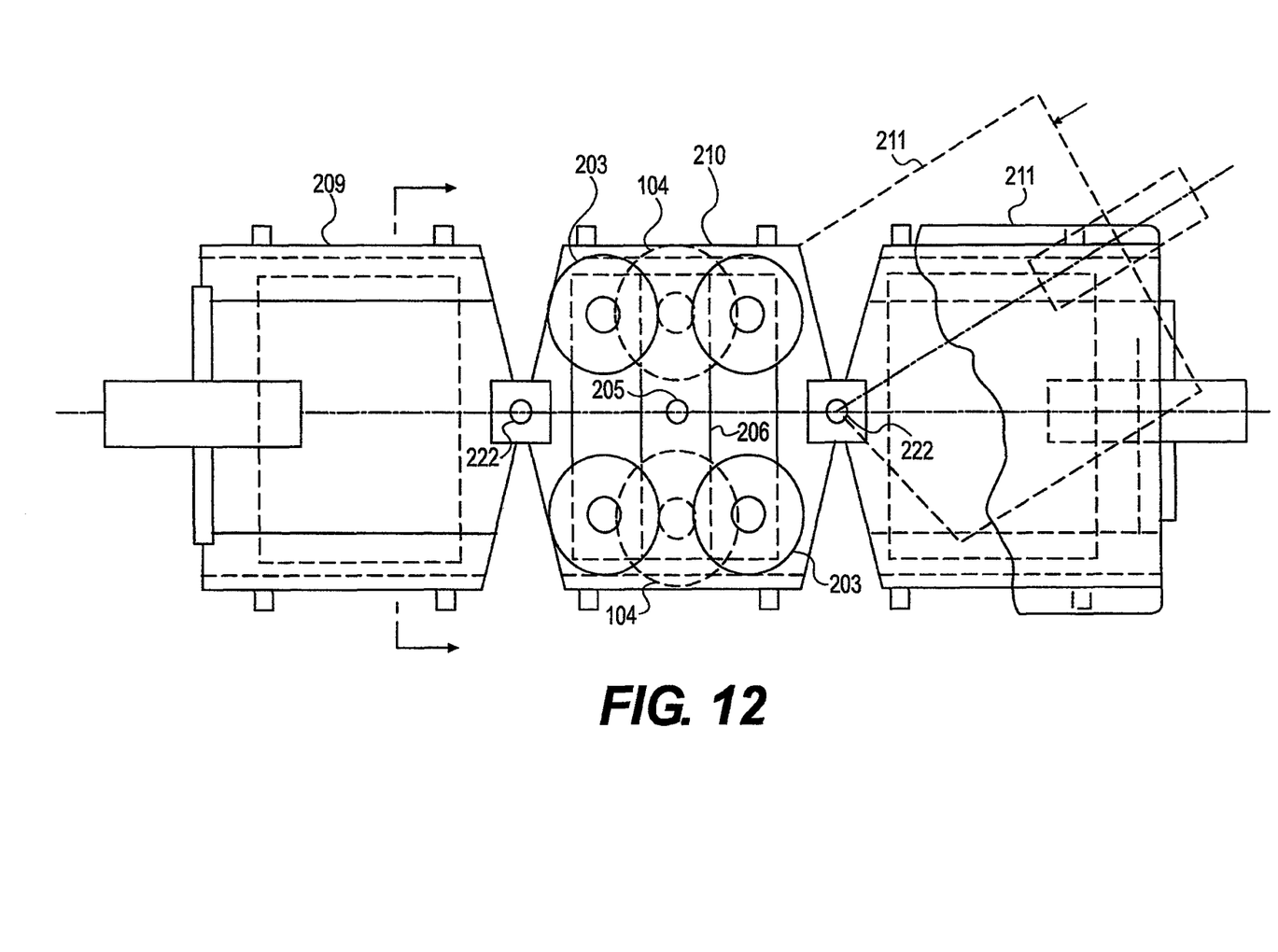
FIG. 12 shows a top view of the embodiment of the invention shown in FIG. 11.
Figure 13:
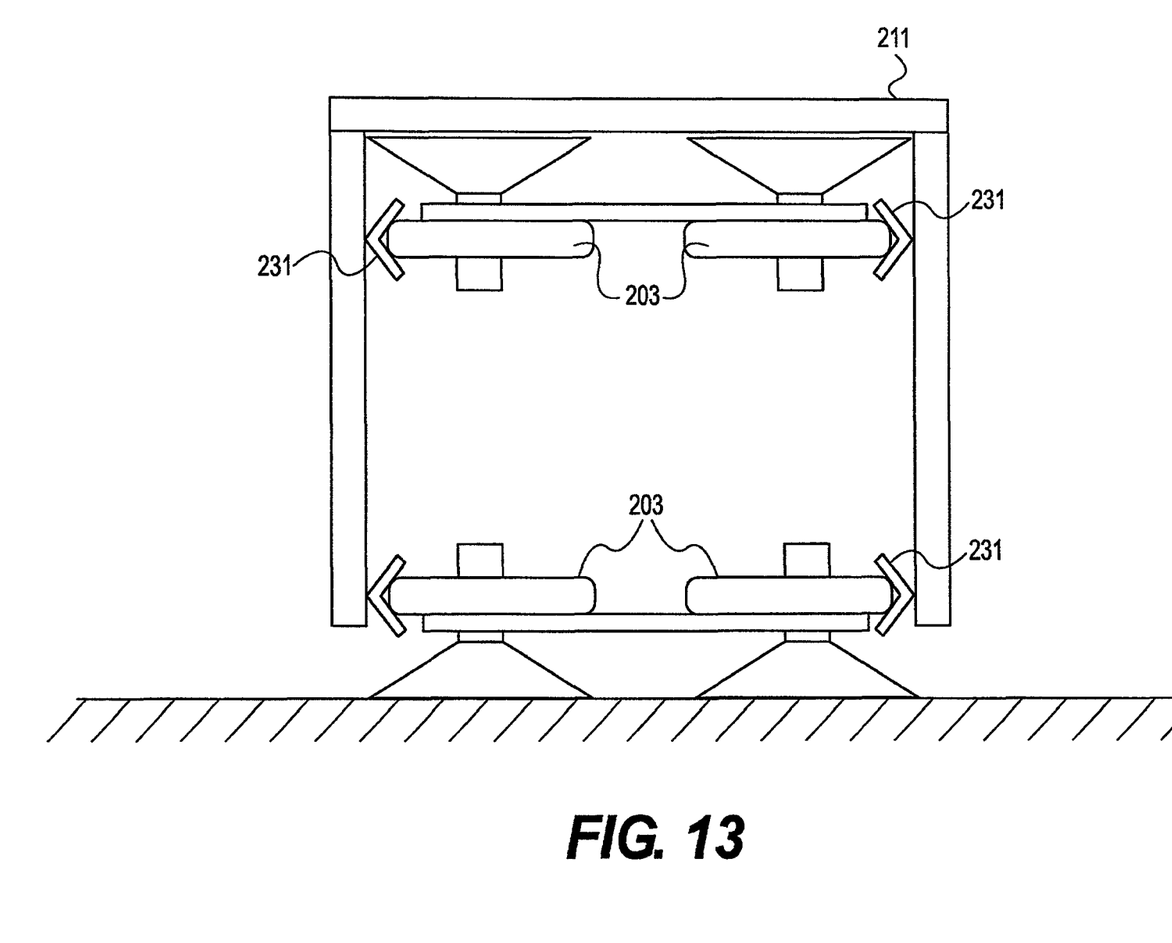
FIG. 13 shows a schematic side view of a section of the support frame of the traction unit shown in FIG. 11.
Figure 14A:
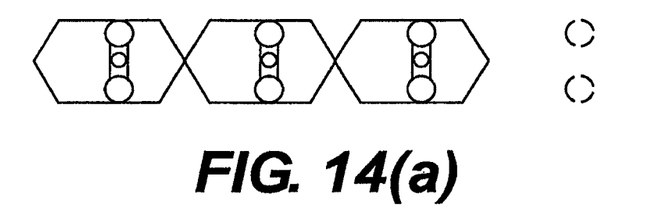
FIGS. 14(a)-14(e) show schematically the positioning of each section of a traction unit in straight line movement and in movement which turns from straight line movement.
Figure 14B:
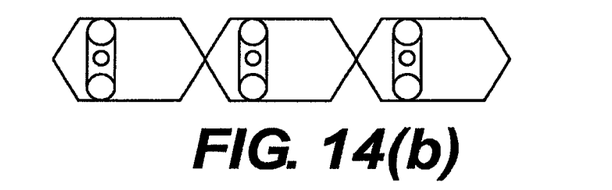
Figure 14C:
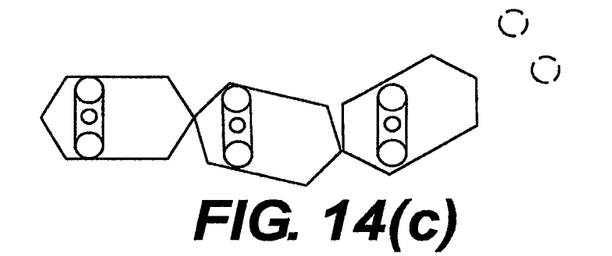
Figure 14D:
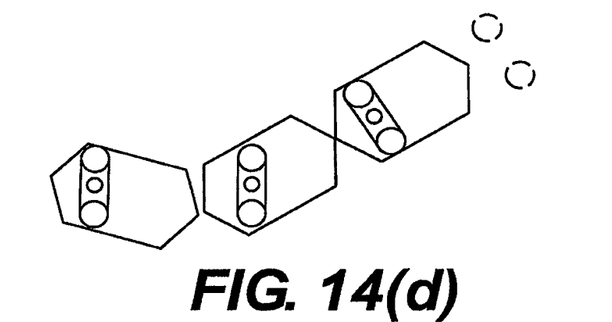
Figure 14E:
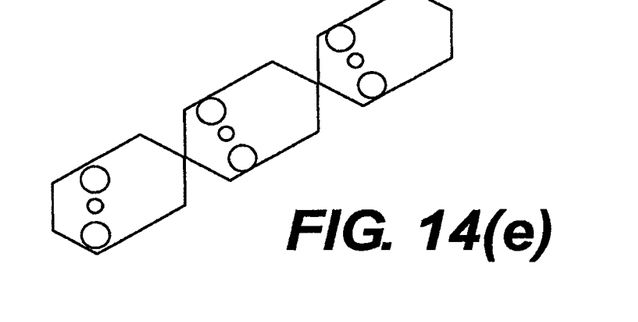

FIG. 11 shows a traction unit according to another embodiment of the present invention. The figure shows a traction unit having vacuum cups 104 mounted on carriers 202 that are connected together by a cable 208 driven by a motor through pulleys 207 and 217. As shown in FIG. 13, the traction unit has a platform or base 211 on which are mounted guide tracks or angle rails 231. The carriers 202 have rollers 203 that engage the angle rails 231 so that as the cable 208 pulls the carriers 202 around the rail tracks, the rollers engage the rails and advance the platform or base 211 with respect to the suction cups 204. As shown in FIG. 12, the sections 209, 210 and 211 of the traction unit are pinned together or pivotally connected to one another at 222 to permit articulated movement of adjacent sections 209, 210 and 211. In an arrangement similar to the first embodiment, a support bracket 206 is pinned to the carrier 202 by a pin or suitable pivoting connection 205 which allows for relative movement. As shown in FIG. 12, when the section 211 is shifted by a positioning device such as a hydraulic cylinder that is pneumatically operated, for example, (not shown) the section 211 is moved without shifting of the vacuum suction cups. Further, FIGS. 14(a)-14(e) show movement of the adjacent sections 209, 210 and 211 in a manner similar to that as shown in FIGS. 7(a)-7(e), and therefore further description of the figures is believed unnecessary.

Still further, if the joint or connection at 222 were a ball joint, then side to side movement and up and down relative movement would be permitted to allow for the traction unit to traverse curved surfaces in which one frame section moves up or down relative to the adjacent frame section. The hydraulic piston/cylinder control, which may be two to a set for each plane of movement, would also need to be flexibly connected to each of the frame sections and 209, 210 and 211 to allow for the up and down and side to side relative movement between adjacent sections. A sensor would be available to sense the traversing of a curved surface and hence the change in up/down relative position between the frame sections. The output of the sensor would be used to provide control of the up/down hydraulic cylinder/piston sets for controlling or damping the up/down movement.

Figure 15A:
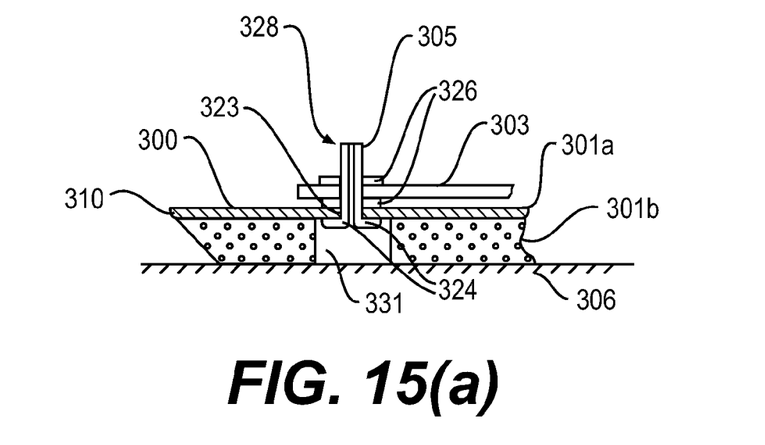
FIGS. 15(a)-(b) show a perspective view and a partial sectional view of a suction pad according to embodiments of the invention, respectively.

FIG. 15(a) shows a perspective view of a suction pad that is suitable for use interchangeably and/or alternatively with suction cups 104. The suction pad 310 may be comprised of an upper portion of a first thickness that is a flexible sheet such as a composite of a woven fiberglass and urethane layer or fiberglass impregnated with urethane 301a that is cemented or otherwise adhered to a lower portion of soft or pliant, closed cell foam material 301b that is also flexible, such as neoprene closed cell foam, e.g., a closed cell sponge rubber blend of Neoprene, EPDM, and/or SBR. Alternatively, the upper and lower portions 301 a and 301b may be of the same material.

Figure 15B:
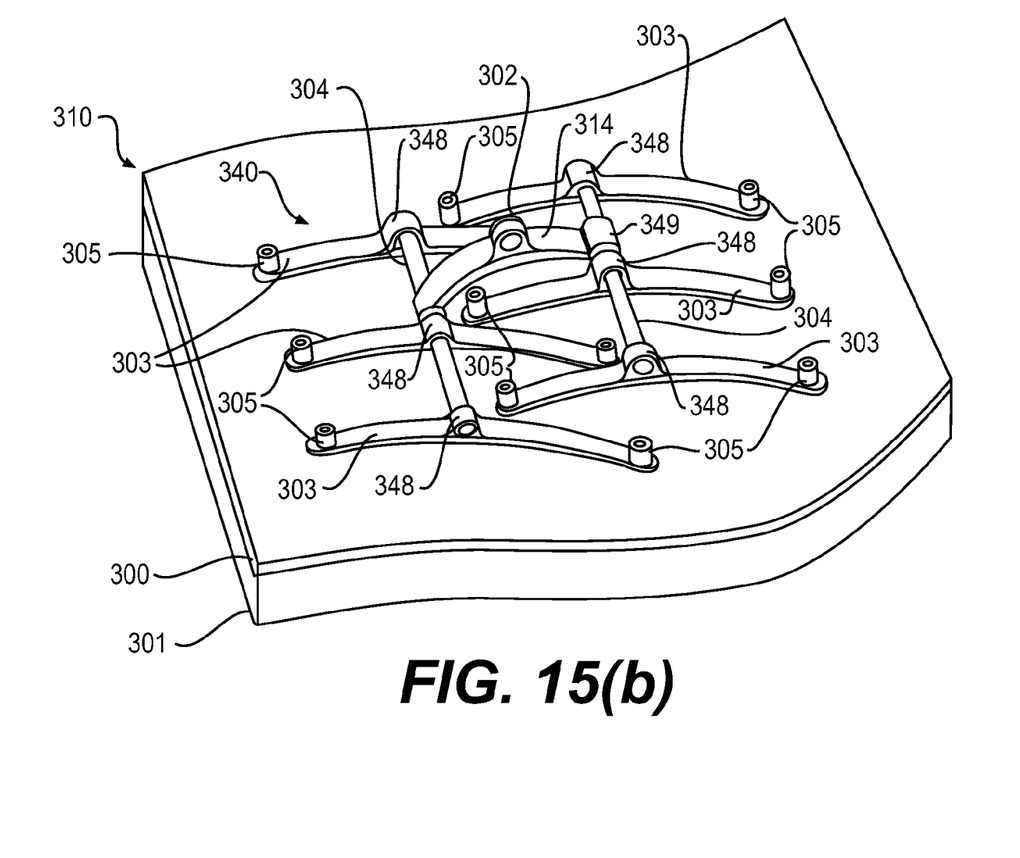

As shown in FIGS. 15(a) and 15(b), plural support members 303 are connected to the pad 310 via a nozzle 305 passing through the top layer 301 a of the pad. The support member 303 has a through bore 323 through which the nozzle 305 passes. The nozzle may be metal or plastic and is fit and secured air-tight into the through hole 323 and includes flared portions 324 that engage the underside of layer 301a. Further, the nozzle provides a connection of the support arm 303 to the pad 310 by sandwiching the top layer 301 a of the pad between the flared portions 324 and the underside of the support member 303 through a compression fit, snap fit or suitable threaded connection that includes shown generally at 326.

The terminal part 328 of the nozzle is connected to a vacuum hose compatible with vacuum hose 111 shown in FIG. 1, for example. The vacuum is supplied to a cavity 331 in the lower layer of the pad 310, which may be a section of the foamed material 301 that is removed or a hollow area provided for in the manufacture of the pad, located below the nozzle 305 as shown in FIG. 15(a).

Preferably the vacuum connection is a slip on fitting to be received by the nozzle 305 for applying a vacuum in the cavity 331 of the vacuum pad. Since the pad is flexible, the vacuum that is provided to the many cavities, one below each nozzle 305, this will compress the pliable foam material onto the surface 306, such that the area around the cavity will be sealed even if the surface is irregular, rough or uneven.

A support structure 340 supports the pad 310 enabling the pad to flex and adapt to any surface that the pads engage. Several, e.g. 3 in FIG. 15(b), of the support members 303 are connected to a connecting rod 304 through rotational support connections such as sleeves or bearings 348. The rods 304 are connected for rotational support to a connecting member 314 through sleeve bearings 349. The arrangement of the support structure 340 permits the pad to flex despite the connection at each of the nozzle connection points to enable a seal to be formed between the irregular surface 306 and the pads to make a system that can seal and grip a rough and uneven surface, for example a concrete wall.

As will be appreciated by those of ordinary skill in the art, the system permits the robot to traverse a rough and uneven surface by substituting the suction pads 310 for the suction cups 104 and by further providing suction hoses to each of the nozzles 305, and otherwise enabling the movement of the robot to be conducted in the same manner as disclosed with respect to the previously described embodiments.

Additionally, the pneumatic operating system which applies suction to the nozzles 305 of a suction pad can be replaced by a hydraulic system permitting the robot to operate under water. A water hose connected to an underwater robot can direct water to a hydraulic designed venturi to produce a partial vacuum (water flow), which is distributed through appropriate hoses to the nozzles of the vacuum pad to provide within each cavity 331 an upwardly flow through flowing flow through the nozzles 305 that enables underwater gripping of the pad.

For a surface of steel, additional gripping could be provided using magnets in place of or in addition to the suction pads 310 or suction cups 104 such that the electrical switching of the control of the magnet is cycled on and off through the movement of the carrier according to an operation similar to that required for providing suction to the suction cups.

While specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A traction unit comprising:
   a plurality of carriers;

at least one suction pad connected to each carrier and supplied with vacuum from a vacuum source each of said suction pads having plural vacuum cavities open to a surface which said suction pad engages;

a carrier support frame which supports the plurality of carriers, each of the plurality of carriers having rollers engaging said carrier support frame;

one of a belt and a chain connecting said plurality of carriers for driving movement of the plurality of carriers around said carrier support frame, said one of said belt and chain being driven by a motor; and a plurality of carrier support frame sections forming said carrier support frame, adjacent ones of said plurality of carrier support frame sections being flexibly connected to one another for relative movement, said one of said belt and chain extending between said adjacent ones of said flexibly connected carrier support frame sections.

2. A traction unit according to claim 1, wherein said adjacent ones of said plurality of carrier support frame sections are pivotally connected to one another and movement of one such section with respect to an adjacent section changes a direction of movement of said traction unit by repositioning one said carrier with respect to said carrier support frame.

3. A traction unit according to claim 1, wherein said plurality of carriers are equally spaced along said carrier support frame and each of said carriers is pivotally connected to a support bracket on which said rollers are supported such that said rollers engage an outer periphery of said carrier support frame and traverse said carrier support frame while permitting relative movement between said support bracket and each said carrier when adjacent ones of said plurality of carrier support frame sections are adjusted for turning movement of said traction unit.

4. A traction unit according to claim 1 wherein adjacent carrier support frame sections of said carrier support frame are adjusted by hydraulic cylinder.

5. A traction unit according to claim 1, wherein said traction unit is remotely operated by a control unit connected to said motor and connected to said hydraulic actuator for changing relative position between said carrier support frame sections of said carrier support frame.

6. A traction unit according to claim 1, wherein said traction unit is controlled independently by a program of a an onboard microprocessor unit.

7. A traction unit according to claim 1, wherein each of said plurality of cavities of said suction pads has a nozzle applying vacuum suction from an opposite side to said surface contacting side.

8. A traction unit according to claim 1, wherein said suction pad has an upper layer and a bottom layer and the upper layer is connected to a frame for flexibly supporting and connecting said suction pad to said carriers.

9. A traction unit according to claim 1, wherein said suction pad has an upper layer of a flexible sheet to which the nozzles are connected and a bottom layer of closed cell foam that is flexible to seal edges of each of said cavities when said suction pad engages a surface.

10. A traction unit according to claim 1, wherein adjacent sections are adjusted both horizontally and vertically by corresponding sets of hydraulic actuators.

* * * * *